United States Patent [19]

Bolton et al.

[11] 4,426,229

[45] Jan. 17, 1984

[54] OXIDIZED ALPHA-OLEFINS

[75] Inventors: Malcolm E. Bolton; Joseph O. Bienvenu, both of Longview, Tex.

[73] Assignee: Petrolite Corporation, St. Louis, Mo.

[21] Appl. No.: 191,462

[22] Filed: Sep. 26, 1980

Related U.S. Application Data

[63] Continuation of Ser. No. 745,159, Nov. 26, 1976, which is a continuation of Ser. No. 340,378, Mar. 12, 1973, abandoned, which is a continuation-in-part of Ser. No. 860,819, Sep. 24, 1969, abandoned.

[51] Int. Cl.³ ............................................. C08L 91/06
[52] U.S. Cl. ...................................... 106/270; 106/10; 106/11; 106/271; 106/272
[58] Field of Search ................... 106/10, 11, 270, 271, 106/272

[56] References Cited

U.S. PATENT DOCUMENTS

| | | | |
|---|---|---|---|
| 2,802,751 | 8/1957 | Hetzel | 106/270 |
| 2,890,125 | 6/1959 | Mange | 106/272 |
| 3,941,608 | 3/1976 | Ehrhardt | 106/270 |
| 4,004,932 | 1/1977 | Bienvenu | 106/270 |

OTHER PUBLICATIONS

Advances in Chemistry, Series No. 34, American Chemical Society, pp. 145–156, 1962.
Zeiss, Organometallic Chemistry, Reinhold, pp. 200–231, 1960.

*Primary Examiner*—Paul R. Michl
*Attorney, Agent, or Firm*—Sidney B. Ring; Hyman F. Glass; Leon Zitver

[57] ABSTRACT

In contrast to hydrocarbon waxes, alpha-olefin waxes can be oxidized with little if any reduction in hardness. The oxidized product can be used as such or further reacted with polyisocyanates to yield isocyanated products. Salts of the isocyanated products (preferably lithium salts) are also prepared which are capable of forming colloidal solutions. These solutions preferably in hydrocarbons have superior film-forming properties when used in polishes, thus yielding when applied to a surface a finish of high gloss, durability, protection, etc. The isocyanated products and salts thereof when employed in carbon paper inks yield a carbon paper having superior properties.

40 Claims, No Drawings

OXIDIZED ALPHA-OLEFINS

This Application is a continuation of Application Ser. No. 745,159, filed Nov. 26, 1976, which is a continuation of Application Ser. No. 340,378, filed Mar. 12, 1973, now abandoned, which in turn was a continuation-in-part of Application Ser. No. 860,819, filed Sept. 24, 1969, now abandoned.

In U.S. Pat. No. 2,890,125, there are described and claimed methods of oxidizing wax, products formed thereby, the reaction of such products with isocyanates, and the use of such isocyanated products in various applications, including polishes and carbon paper inks.

We have now discovered that where a particular type of mixture of hydrocarbons, i.e. a mixture of particular alpha-olefins, is oxidized and treated with isocyanates, a superior product is formed. We have also discovered that where a mixture of particular alpha-olefins is oxidized in the manner commonly applied to hydrocarbon waxes, an oxidized product is formed with substantially little, if any, reduction in the hardness of the oxidized product as compared to the non-oxidized product. This result is unexpected since it is known that the oxidation of hydrocarbon waxes results in a reduction in hardness. This unexpectedness is reaffirmed by the fact that if the alpha-olefins are reduced prior to oxidation to remove unsaturation, the oxidized product follows the conventional pattern where oxidation of the reduced products yields a softer oxidized wax.

In addition, we have found when these oxidized waxes are isocyanated, they yield superior products for example, when employed in polishes, carbon paper inks, and the like.

The preservation of hardness in the oxidized products upgrades the resulting isocyanated products as compared to corresponding products where oxidation degrades these properties.

In addition, we have found that salts and most particularly isocyanated oxidized alpha-olefin waxes yield products having superior film-forming properties when used in polishes, thus yielding when applied a finish of high gloss, durability, protection, etc.

In addition, we have found that carbon paper when prepared from the isocyanated product yields a product having superior properties.

The alpha-olefins of this invention are preferably those prepared by the addition of Aluminum-Carbon groups to the C=C bond as illustrated by the addition to ethylene. It is essentially a stepwise organo-metallic synthesis. It is illustrated by the following equations where the aluminum trialkyl is triethyl aluminum.

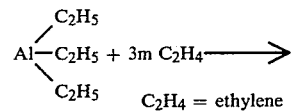

$C_2H_4$ = ethylene

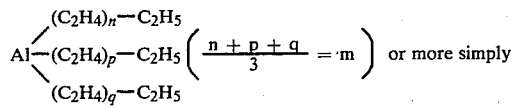 or more simply

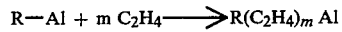

The polyolefin is then recovered. Colloidal nickel assists in the alkylation displacement steps.

This process is described in "Polymerization and Polycondensate Processes," Advances in Chemistry, Series No. 34 (American Chemical Society 1962) pages 145-156, and Organo-Metallic Chemistry, Zeiss (Reinhold 1960) pages 200-231.

This invention will be illustrated with the following commercial mixture, sold by the Gulf Oil Company, of alpha-olefins prepared by stepwise addition of ethylene to organo-metallics, such as triethyl aluminum, in the presence of colloidal nickel. It is known as the $C_{30+}$ Alpha Olefin Fraction, having at least 72%, or roughly at least about 70%, of such olefins. Its properties, as set forth in the Gulf Oil Company July 21, 1967 Gulf Oil data sheet, are as follows:

TABLE I

GULF OIL CO. $C_{30+}$ ALPHA OLEFIN FRACTION

| PRODUCT CHARACTERISTICS | TYPICAL VALUE | SALES SPECIFICATION |
|---|---|---|
| Carbon No. Distribution, Gulf 1030: Wt. % | | |
| $C_{28}$ and lower | 22 | max. 28 |
| $C_{30}$ and higher | 78 | min. 72 |
| Appearance: at 175-185° F. | Passes | Clear & bright |
| Color, Saybolt | +2 | min. 0 |
| Viscosity, SUS: Sec. at 210° F. | 52.4 | max. 59.2 |
| Viscosity, Kin: Cs. at 210° F. | 8.0 | max. 10.0 |
| Flash, COC: °F. | 510 | — |
| Melting Point, $D^{a}$·127: °F. | 160 | max. 175 |

TYPICAL VALUES

| Composition: Carbon Number Distribution by GLC: wt. % | |
|---|---|
| $C_{28}$ and Below | 1.7 |
| $C_{30}$ | 5.0 |
| $C_{32}$ | 11.3 |
| $C_{34}$ | 15.3 |
| $C_{36}$ | 15.5 |
| $C_{38}$ | 13.7 |
| $C_{40}$ | 11.6 |
| $C_{42}$ | 9.1 |
| $C_{44}$ | 8.3 |
| $C_{46}$ | 5.8 |
| $C_{48}$ and above | 2.7 |
| Olefin - Type Distribution by Infrared Spectroscopy: mol % | |
| $RCH=CH_2$ | 33 |
| $R_2C=CH_2$ | 18 |
| $RCH=CHR$ (cis) | 23 |
| $RCH=CHR$ (trans) | 4 |
| $R_2C=CHR$ | 22 |

Average Values, $C_{30+}$ Alpha Olefin Fractions

| Characteristic | Average Values |
|---|---|
| Blocking Point, D 1465: °F. | 115 |
| Color, Saybolt, D 156 | <−15 |
| Congealing Point, D 938: °F. | 169 |
| FDA Ultraviolet Absorption (extraction procedure): absorbance/cm | |
| 280-289 mμ | 0.02 |
| 290-299 mμ | 0.02 |
| 300-359 mμ | 0.02 |
| 360-400 mμ | 0.01 |
| Melting Point, D 127: °F. | 181.5 |
| Odor, D 1833 | 3.5 |
| Penetration, D 1321 | 6 |
| Penetration at 100°F. (D 1321 mod.) | 18 |
| Scaling Strength, D 2005: gm./in. | |
| at a deposition of 2.5 gm./sq. ft. | 19.6 |
| at a deposition of 3.0 gm./sq. ft. | 22.0 |
| Specific Gravity, D70: 77°/77° F. | 0.8667 |
| Tensile Strength, D 1320: lbs./sq. in. | 205 |
| Viscosity, D 2161: SUS at 210° F. | 58.2 |

$^{a}$ASTM Method

The art of oxidizing hydrocarbon waxes is old and has been extensively described in the literature. A variety of hydrocarbon waxes and comparable compounds principally hydrocarbon in nature have been subjected to oxidation in various ways and particularly by the use of air, ozone, or oxygen in the presence of an oxidation catalyst, such as a wax soluble organic salt such as manganese or cobalt naphthenate. Other ways of oxidizing hydrocarbon mixtures involve the use of materials such as the oxides of nitrogen and various chemical oxidizing agents such as chromic acid, hypochlorous acid, etc. Also, a hydrocarbon mixture can be subjected to very mild forms of oxidation such as cracking and the cracked products may be subjected to oxidation by such methods as the Oxo process or other types to introduce oxygen containing functional groups such as carboxylic acid, alcohols, esters, etc.

For convenience, and for reasons of economy, it is preferred to carry out the oxidation by blowing with an oxygen-containing gas at temperatures ranging from 240° to 340° F. for a sufficient length of time to give the desired acid and saponification number. This oxidation is carried out without catalyst or in the presence of a catalyst such as a soluble cobalt or a manganese soap; such as a stearate, oleate, naphthenate, etc. Also, wax insoluble catalysts may be used such as potassium permanganate. These catalysts are used for example in concentrations ranging from about 0.2 to 2%.

This oxidation procedure can be carried out in manners as described in numerous patents, such as U.S. Pat. No. 2,249,708, dated July 15, 1941, to Hicks-Bruun; U.S. Pat. No. 2,486,454, dated Nov. 1, 1949, to Zellner; U.S. Pat. No. 2,573,422, dated Oct. 30, 1951, to Fish; and, U.S. Pat. No. 2,674,613, dated Apr. 6, 1954, to Nelson. Also, the three-part article entitled "Oxidation of Paraffins" by Ernest Stossel in The Oil and Gas Journal, vol. 44, No. 11, pp. 130-9; No. 15, pp. 145-51; No. 17, pp. 69-77 (1945) should be especially noted and also the 121 references in this article. Oxidations are also described in U.S. Pat. Nos. 2,890,124 and 2,890,125 which is the reference incorporated into the present application as if part hereof The following examples are presented for purposes of illustration and not of limitation.

EXAMPLE A

Oxidation Without Catalysts

A pilot oxidizer (a 2-inch steam jacketed column fitted with a coarse air sparger) was charged with 1000 gms. of wax. The temperature was adjusted and maintained at 250°-255° F. The air rate was adjusted between 1 and 5 cc. per minute per gram of wax. After an induction period, oxidation proceeded to the desired values.

EXAMPLE B

Oxidation with Catalysts

Example 1 was repeated except that 3-5 grams of a catalyst (salts of Cobalt or Manganese) were present during oxidation.

The results of the oxidation of various waxes are presented in the following Table II so that the properties of unoxidized waxes can be compared with the properties of the corresponding oxidized waxes. They were oxidized according to the process of Example A.

| | TABLE II (A) Properties of Various Waxes Before Oxidation | | | | |
|---|---|---|---|---|---|
| Example Wax | 1 Tank Bottom Micro Wax | 2 Tank Bottom Micro Wax | 3 Fischer-Tropsch Wax | 4 Paraffin Wax | 5 C-30 + Alpha Olefins |
| ASTM D-127 Melting Point, °F. | 194 | 196 | 228 | 135 | 176 |
| ASTM D-1321 Pen. α 77° F. | 4.5 | 3.0 | 2.0 | 13.0 | 13.5 |
| Acid No.* | Nil | Nil | Nil | Nil | Nil |
| Sap. No.* | Nil | Nil | Nil | Nil | Nil |

| | TABLE II (B) Properties of Above Waxes After Oxidation | | | | | |
|---|---|---|---|---|---|---|
| Example | 6 | 7 | 8 | 9 | 10 | 11 | 12 |
| Original Wax Ex. | 1 | 2 | 3 | 3 | 4 | 5 | 5 |
| ASTM D-127 Melting Point, °F. | 182 | 183 | 197 | 196 | 122 | 171 | 170 |
| ASTM D-1321 Pent α 77° F. | 11.5 | 8.0 | 8.1 | 13.6 | 68.0 | 13.0 | 21.6 |
| Acid No.* | 32.8 | 32.9 | 32.1 | 50.8 | 29.5 | 31.2 | 40.6 |
| Sap. No.* | 90.6 | 77.2 | 94.0 | 97.5 | 92.5 | 77.0 | 102.0 |

*Acid and saponification numbers are expressed as equivalents to Milligrams of KOH per gram of sample wax.

From the foregoing Tables II (A) and II (B), it is evident that the hardness of the alpha-olefin wax (as judged by penetration at 77° F. ASTM D-1321) changes less upon oxidation than the other waxes. It is to be noted that the higher the penetration value the softer the wax. When the waxes are oxidized to an acid number of about 31, the penetration of Wax Example 1 increased about 2.5 times, Wax Example 2 increased about 2.7 times, Wax Example 3 increased about 4 times, Wax Example 4 increased about 5 times.

In contrast the penetration or hardness of the alpha-olefin wax Examples remained substantially unchanged.

Similarly where oxidation is continued to a higher acid number, i.e. between 40-50, the penetration of Wax Example 3 increased 25 times whereas the alpha-olefin wax increases only 1.6 times. From the above data it is evident that by controlled oxidation alpha-olefin wax can be oxidized without changing its hardness. Where more extreme oxidation is employed, the hardness of alpha-olefin wax changes slightly in contrast to other waxes whose penetration value changes considerably upon a similar degree of oxidation.

The uniqueness of the behavior of alpha-olefin waxes is emphasized by the fact that if the alpha-olefin wax is hydrogenated prior to oxidation so as to remove unsaturation, the oxidized hydrogenated wax decreases in hardness in the manner generally expected of hydrocarbon waxes, as occurs with the Waxes of Examples 1–4 above.

The following Example illustrates the improved properties obtained by the use of oxidized alpha-olefins in wax emulsions.

EXAMPLE C

The following wax emulsions had very good film properties (good cohesive and tough filming characteristics) when used with the proper leveling resin solutions to produce buffable dry bright floor polishes.

| Ingredients | Parts by Wt. |
| --- | --- |
| Oxidized wax from Table II (B) (Examples 6, 7, 8, or 11) | 40 |
| Micro or Fischer-Tropsch wax from Table II (A) (Examples 1, 2, or 3) | 20 |
| Paraffin wax from Table II (A) (Example 4) | 20 |
| Oxidized Polyethylene (Eastman's Epolene E-10) | 20 |
| Oleic Acid | 2 |
| Monamulse FW-17 (Nonionic from Mona Industries) | 1 |
| Potassium Hydroxide, 85% | 2 |
| Morpholine | 6 |
| Water to make 12% solids | 755 |

EXAMPLE D

The non-oxidized C-30+ Alpha-Olefins was substituted for the paraffin wax in the above formula, and the resulting film had very poor cohesive strength and crumbled or smeared badly under traffic or buffing. This is very noticeable even though the two waxes were equal in hardness.

EXAMPLE E

The Oxidized C-30+ Alpha-Olefin (Example 11) was substituted in the above formula for unoxidized C-30+ Alpha-Olefin and the resulting film was tough and cohesive. Thus, oxidation had coverted an unsuitable product into an excellent emulsion polish.

Besides being used as oxidized products per se, they can also be further modified chemically.

The oxidized alpha-olefins can be reacted with a wide variety of polyisocyanate in varying amounts under varying conditions and optionally in the presence of various additives. Of course, the nature of the product will depend upon the particular and amounts of reactants, and conditions. In general, about 1–20% or more of the polyisocyanate is reacted with the oxidized alpha-olefin, such as from about 2–15, for example from about 5–10, but preferably from 6 to 8%.

Reaction times and temperatures can also be varied. The preferred reaction time is from about one to eight hours. The most pronounced changes in the nature of the product occur during the first hour or two and then there is a gradual improvement in some of the properties, i.e., penetration and oil retention penetration. These reactions are normally carried out at temperatures just above the melting point of the wax on up to 290° F. and higher. Where desired one can carry out the reaction at lower temperatures so as to obtain products of lighter colors and other slightly improved properties. Very little discoloration of the oxidized wax is obtained when it is reacted with diisocyanate at 200° F., but it is preferred to carry out the reaction at slightly higher temperatures for the sake of convenience.

It is also possible to react the diisocyanates with glycols such as ethylene glycol, propylene glycol, triethylene glycol, tetraethylene glycol, butylene glycol, and higher homologues and similar type compounds; diethylene glycol, dipropylene glycol, dibutylene glycol and higher molecular weight compounds of this general type; analogous amine and amine alcohol type compounds; and, other polyhydric and/or polyamines. It is best to use an excess of a diisocyanate so that the resultant will have free reactive isocyanate groups. These resultants can then be reacted with oxidized waxes to yield improved products.

Other additives can also be added to modify the resulting properties of the products particularly those having reactive hydrogens capable of reacting with the isocyanate groups.

The preferred isocyanates of this invention are the polyisocyanates and more specifically the diisocyanates, which of course contain two distinct and separate isocyanate groups. Representative compounds are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene-1,3-diisocyanate, butylene-2,3-diisocyanate; the alkylidine diisocyanates such as ethylidene diisocyanate, butylidene diisocyanate, and heptylidene diisocyanate. The cycloalkylene diisocyanates such as cyclopentylene-1,3-diisocyanate, cyclohexylene-1,2-diisocyanate, cyclohexylene-1,4-diisocyanate; the aromatic diisocyanates such as m-phenylene diisocyanate, p-phenylene diisocyanate, 1-methylphenylene-2,4-diisocyanate, 1-methylphenylene-2,6-diisocyanate, 3,3'-bitolylene-4,4'-diisocyanate, naphthylene-1,4-diisocyanate, naphthylene-1,5-diisocyanate; aliphatic-aromatic diisocyanates such as xylylene-1,4-diisocyanate, xylylene-1,3-diisocyanate, 4,4'-diphenylenemethane diisocyanate, 4,4'-diphenylenepropane diisocyanate, etc.

Substituted isocyanates can also be employed, for example, substituted derivatives of the above and other compounds containing halogens, sulfur, oxygen, etc., containing groups for example:

1-chloro-2,4-phenylene diisocyanate

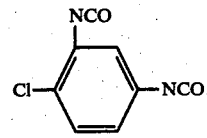

Dimethoxy-4,4'-biphenylene diisocyanate

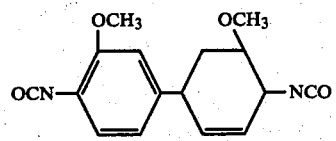

4,4'-sulfonylbis (phenyl isocyanate)

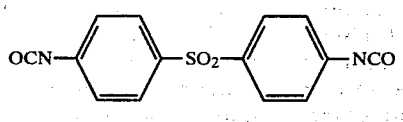

etc.

The diisocyanates of the types listed in the above paragraph are the ones which are most preferred for purposes of this invention. Exampltwo reactive groups of formula —N=C=O which can be used, there may be mentioned 1,2,4-benzene triisocyanate and butane-1,2,2-triisocyanate.

Of course, it should be remembered that the polyisothiocyanates may be used instead of the polyisocyanates and representative examples would be those given above with the single change that the oxygen atom is substituted by sulfur.

The following examples illustrate the reaction of the oxidized waxes of this invention with polyisocyanates, such as diisocyanates, to obtain the superior products of this invention.

EXAMPLE 13

500 gms. of approximately 21 acid number oxidized C-30+ Alpha-Olefins were charged to a liter flask equipped with agitator and heating element. The temperature was adjusted to approximately 240° F. while adding 35 gms. of toluene-2,4-di-isocyanate with agitation. The reaction was maintained under these conditions for approximately 6 hours. The resulting product had a melting point of 162° F., a penetration of 5.9, acid no. 17.1, sap. no. 75.1.

EXAMPLE 14

500 gms. of approximately 30 acid no. oxidized C-30+ Alpha-Olefins was charged to the heated and stirred reactor. 5 gms. of a polyol such as trimethylolpropane was added and mixed with the molten wax. The temperature was adjusted to approximately 240° F. while adding 30 gms. of toluene-2,4-diisocyanate with agitation. The reaction was maintained under these conditions for approximately six hours. The resulting product had a melting point of 162° F., a penetration of 5.0, acid no. 17.0, sap. no. 74.0.

The polyol employed is not necessary to produce a suitable product. However, products made with small amounts of polyol such as about 0.5–1.0% polyol are much more stable toward heat and can be handled and remelted with less care. Larger or smaller amount of polyol can also be employed.

The following are representative of other isocyanates which can be reacted.

TABLE III

| Symbol | Name | Formula |
|---|---|---|
| TDI | Toluene-2,4-diisocyanate | (CH$_3$, 2,4-NCO phenyl) |
| TD-80 | 80% toluene-2,4-diisocyanate | (CH$_3$, 2,4-NCO phenyl) |
| | 20% toluene-2,6-diisocyanate | (CH$_3$, 2,6-NCO phenyl) |
| MDI | Diphenylmethane-4,4'-diisocyanate | OCN—C$_6$H$_4$—CH$_2$—C$_6$H$_4$—NCO |
| NDI | Naphthylene-1,5-diisocyanate | naphthalene-1,5-(NCO)$_2$ |
| TBDI | 3,3'-bitoluene-4,4-diisocyanate | OCN—(CH$_3$-phenyl)—(CH$_3$-phenyl)—NCO |
| HMDI | Hexamethylene diisocyanate | OCN(CH$_2$)$_6$NCO |
| ClPDI | 1-chloro-2,4-phenylene diisocyanate | Cl—C$_6$H$_3$(NCO)$_2$ |
| MBPDI | 3,3-dimethoxy-4,4'-biphenylene diisocyanate | OCN—(OCH$_3$-phenyl)—(OCH$_3$-phenyl)—NCO |

Suitable catalysts are amine catalysts such as N-ethyl morpholine, triethylene diamine, triethylamine, tetramethyl-1,3-butane diamine, dimethylethethanolamine, dimethyl cyclohexylamine, N-methyldicyclohexylamine, N-cyclohexylpiperidine, and N-cyclohexylmorpholine. Organotin catalysts may also be used but we prefer in practice to use an amine catalyst when a catlyst is employed.

Various patents, and other published literature discuss various types of carbon paper, particularly in regard to formulation of the various ingredients, test procedures, utilization of various waxes, etc. See, for example, U.S. Pat. No. 2,426,248, dated Aug. 26, 1947, to Sugarman; Chapter 12 entitled "Carbon Paper and Other Duplicating Papers" by R. R. Wissinger in the book edited by R. H. Mosher entitled "Specialty Papers", published by the Chemical Publishing Co., New York in 1950; the paper on the "Rheology of Carbon Paper Inks" by E. S. Gale and B. J. Staneslow in the American Ink Maker issue of December 1953; the paper on "Converting of Carbon Papers" by F. M. McFarland in the Paper Trade Journal, Volume 137, pages 230–237 (1953); and the book Commercial Waxes by H. Bennett, pages 268, 377 and 429–431, published by Chemical Publishing Co., New York, in 1944.

There are many different types of carbon paper and related materials in use today. The three most widely used types of carbon paper are the one-time carbon which is used once and then thrown away, the pencil carbon which may also be used once, or may be used many times, and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of the vehicle to impart certain properties such as plasticity and toughness, and paraffin wax may be used as a a substitute for part of the wax to give a cheaper formulation. One of the unique properties of many of the compounds of this invention is that they are able to carry a lot of paraffin wax into the ink formulation without detracting greatly from the desirable characteristics required. In this respect, these products are comparable to Carnauba and Ouricury and superior to Montan. In fact in some cases the ink may be improved by the addition of material such as paraffin. Other materials may be used in carbon paper inks such as clay to lessen the cost of the formula, Oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100° F.) up to heavy oils and petrolatums may be used. These oils and petrolatums may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can absorb the dye and other materials. As one goes down the scale of carbon blacks, lesser amounts of this very desirable oxygenated surface are encountered. Blue pigments may also be used, such as Milori Blue, and others, as can many other blue pigments. Numerous other colored pigments may also be used as described in the literature.

Many dyes are commonly employed in carbon paper inks. The common ones are Methyl Violet, Nigrosine, Victoria Blue, etc., and salts of these materials. It is advantageous to use a dye which is soluble in the wax, but if this is impossible, a solubilizer must be used. One of the advantages of using the compounds of this invention is that the dye is soluble in the wax and no solubilizer is necessary. In general, any solubilizer, which is used will detract from the qualities of the finished ink, i.e., will cause dye bleed, soften the ink, cause frosting, etc. In some instances it is possible to completely eliminate the dye.

A wax to be useful for this purpose, must have many specific properties when used in small concentration in the finished ink; for example, in concentrations of from 8% to 12% in one-time carbon paper inks, or in higher percentages, up to 30% or 40%, in typewriter carbons.

To be useful for carbon paper inks a wax must be able to dissolve the dye, such as methyl violet, Victoria blue, nigrosine, etc., preferably without the addition of a solubilizer, such as oleic acid. In this respect, the waxes of this invention are much superior to the natural waxes Carnauba, Ouricury, and Montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives B-Type dispersion or better, at 6%, no flow difficulties would be expected. Also, in this respect, many of the products of this invention are equal to or superior to the natural waves Ouricury, Carnauba and Montan.

Another procedure is the simple flow test described below. Many of the products of this invention are markedly superior to natural waxes on this test.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable, in some cases superior, to Carnauba, Ouricury and Montan which is a property which is often so hard to duplicate.

These inks may be prepared either in a ball mill or a three-roll mill by convention procedures using temperatures of from approximately 190° F. to 220° F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

Among the properties which are highly desirable in carbon paper waxes are oil retention penetration and carbon dispersion. The properties are tested as follows:

Oil Retention Penetration Test:

Twenty-five grams of wax on test and 25 g. of a 100 SUS mineral oil (i.e., Texaco Ink Oil No. 538) are placed in a 150 ml beaker which is covered by a watch glass and placed in an oven at 100° C. for two hours. Stir the sample with a glass rod, pour it into an aluminum foil dish (Fisher Scientific Company Cat. No. 8-732) resting on asbestos, and then cover with a 600 ml beaker. Allow the sample to stand for one hour at room temperature, then transfer to a water bath at 25.0° + or −0.2° C. and hold for 3-4 hours. Penetration values are then obtained on the top and bottom of the sample, and these values are averaged to give the oil retention penetration. Penetration values are determined under a test load of 50 g. for 5 seconds, and are reported to the nearest tenth of a millimeter. The penetration needle employed is similar to that described in ASTM test method D 1321-54T except that the length of taper is 23 mm. rather than 6.5 mm.

The results of the above test are reported as 50/50 oil retention penetrations. The test may also be carried out using 30 g oil and 20 g wax. These results are repoted as 60/40 oil retention penetrations.

Ink Flow Test

11

A test ink was prepared with the following formula

|  | Wt. % |
|---|---|
| Carnauba | 10 |
| 145 M. P. Paraffin | 12 |
| 100 Sec. Ink Oil | 42 |
| Furnace Black | 20 |
| Channel Black | 10 |

The test ink is melted on a hot plate at about 225° F. and 90 parts well blended with 10 parts of the material to be tested. A drop of the mixture is allowed to fall from the end of a ⅛" cylindrical wood applicator on to a clean 225° F. hot plate surface. The diameter of the resulting spot is measured in cm. and reported as 10% flow. The spot size from a similar procedure using 94 parts of test ink and 6 parts of material to be tested is reported as 6% flow. A flow of 0.7 is obtained for the straight test ink.

Oil Bleed Test

An oil wax cake similar to that described under the oil retention penetration is prepared. The cake contains 60% oil and 40% wax and is approximately 4 cm. in diameter. The cake is placed on a clean 7 cm. Whatman No. 2 Filter Paper and a 150 g weight placed on top of the cake. The oil bleed is reported as the percentage of the paper which is impregnated by oil after 2 hrs.

The oxidation products most useful for the diisocyanate reactions vary in acid number from about 18 to about 40, with the range of 20-25 being preferred if the resulting product is designed for use in the carbon ink field. The oxidations may be carried out at temperatures up to 320° F. Useful products are obtained with 2-10 parts of di-isocyanate per 100 parts of oxidized C-30+ Alpha Olefins.

Toluene 2,4-di-isocyanate reaction products made by Examples 13 and 14 are useful in carbon ink manufacture for one-time carbons. These waxes have excellent carbon dispersing and low oil bleed properties. The hardness or penetration values of a mixture of 50% oil—50 % wax are considerably softer than those made with oil and Montan wax, but the resulting inks are harder than those prepared with Montan. This resultant hard ink is unexpected in the art. The following table with ink formula and data will show how these waxes compare with Montan wax, a standard for the carbon paper ink art:

TABLE IV

| Ingredients | Parts by Weight | |
|---|---|---|
| Ink Formula | | |
| Wax from Example 14 | 50 | |
| Reibeck Montan Wax | | 50 |
| Mineral Oil | 50 | 50 |
| Oil Extended Hardness (Needle penetration at 77° F.) | 100 | 31 |
| Wax from Example 14 | 12.0 | |
| Reibeck Montan Wax | | 12.0 |
| 156° M. P. Paraffin (Sunoco 5512) | 30.0 | 30.0 |
| Methyl Violet Base | 0.1 | 0.1 |
| Furnace Black | 22.0 | 22.0 |
| Toning Iron Blue | 3.0 | 3.0 |
| 100 SUS Mineral Oil | 32.9 | 32.9 |
| Ink Viscosity at 210° F., cps. initial | 21 | 42 |
| Ink Viscosity at 210° F., cps. aged 16 hrs. | 35 | 311 |
| Ink Penetration at 77° F. | 19 | 24 |

It is notable that the hardness of the alpha-olefin ink unexpectedly increased by a factor of 5 whereas the Montan wax ink increased by a factor of less than 1.5.

USE IN OTHER INKS

The products of this invention are also useful in other types of inks such as liquid inks. Examples of such inks are news ink, flexographic ink, rotogravure ink and screen ink.

OTHER USES

The products of this invention are also useful in other systems where carbon black is present in an organic medium. Examples of such systems are black rubber goods, black-loaded plastics e.g. polyethylene, PVC and ABS, paints containing carbon black or pigments which interact with the products of this invention.

Salts of isocyanated, oxidized alpha-olefins can also be prepared to yield products having unexpected properties. Although a wide variety of salts can be employed such as, for example, salts of sodium, potassium, calcium, strontium, lithium, etc., lithium salts are preferred. They are preferably added as hydroxides but other salts such as acetates, formates, citrates, maleates, lactates, salicylates, etc. can also be employed.

The following Example is presented for purposes of illustration and not of limitation.

EXAMPLE 15

The product of Example 14 (1000 gm) was added to a stirred and heated reactor. When the temperature of the reactor reached 200° F., 10 gms. of LiOH (added as a hot water solution) were added. The reaction was stirred and maintained at 180°-210° F. for one hour. Then the temperature was gradually raised to 260° F. to drive off the water. The resulting product had a Ring and Ball Melting Point of 156.5° F., a penetration of 3.5, an acid no. of 10.7, a saponification No. of 59.0, and an oil extended hardness (50 oil—50 wax) penetration of 31.

When the above product of Example 15 was used in carbon ink formulations, a sharper and cleaner write-off was obtained as well as good resistance to oil bleed.

The oil extended hardness (50 oil—50 wax) penetration was comparable to Reibeck Montan Wax.

The product of Example 15, (i.e. the Lithium salt) has another unique property. It forms collodial solutions in organic solvents, such as hydrocarbons, for example aliphatic hydrocarbons, aromatic hydrocarbons, mixed aromatic-aliphatic hydrocarbons, etc. which solutions form a continuous film upon drying. These properties are illustrated in the following Table.

TABLE V

| Ingredients | Parts by Weight | | | | |
|---|---|---|---|---|---|
| Product from Example 15 | 10 | 25 | | | |
| Carnauba Wax | | | 10 | | |
| Tank Bottom Micro Wax | | | | 10 | 25 |
| Oxidized Tank Bottom Wax | | | | | 10 | 25 |

TABLE V-continued

| | Parts by Weight | | | | | | | | |
|---|---|---|---|---|---|---|---|---|---|
| Paraffin Wax | | | | | | | | 10 | 25 |
| Mineral Spirits | 90 | 75 | 90 | 90 | 75 | 90 | 75 | 90 | 75 |
| Solution Properties | | | | | | | | | |
| Thin Solution | yes | | no | no | no | yes | | yes | |
| Soft Paste | | yes | no | yes | yes | | | | yes |
| (glossy) | | yes | no | no | no | | | | no |
| Hard Paste | | | yes | no | no | | no | | |
| Thick Solution | | | | yes | | | yes | | yes |
| Solvent Separation | no | no | | no | no | yes | yes | no | no |
| Fast Drying | yes | yes | yes | no | no | yes | no | no | no |
| Good Film Forming | yes | yes | no | no | no | no | no | yes | yes |
| Film Tough | yes | yes | yes | yes | yes | yes | yes | no | no |
| Buffed Gloss | good | good | good | good | good | good | good | poor | poor |

This Lithium salt product (Example 15) is useful in solvent inks, floor polishes, car polishes, shoe polishes, furniture polishes, mold release compounds, protective coatings, and conventional oil-base carbon ink formulations.

Other metals such as sodium, potassium, calcium, etc., also produce useful products.

Paste type solvent polishes can also be prepared with adding a wax or waxy type solid to the solution of the isocyanated salt. The following is a typical example.

EXAMPLE 16

| | Parts by Weight |
|---|---|
| Product of Example 15 | 12 |
| Paraffin 145° F. m.p. | 8 |
| Stoddard Solvent | 80 |

The above product is a paste type solvent polish having a mirror (glossy) surface of great sales appeal. It has excellent dye solubilities which make it very useful in polish of the shoe polish type. This polish is very easy to spread during application and the resulting dry film is very smooth and easy to buff to a high gloss.

Although the present invention has been described in conjunction with the preferred embodiments, it will be understood that modifications and variations may be resorted to without departing from the spirit or scope of this invention. Such variations and modifications are considered to be within the scope of the appended claims.

We claim:

1. A wax comprising a mixture of oxidized alpha-olefins, said aliphatic alpha-olefins comprising a mixture of alpha-olefins having the following characteristics:

| Carbon No. Distribution, Wt. % | |
|---|---|
| $C_{28}$ and lower | max. 28 |
| $C_{30}$ and higher | min. 72 |
| Appearance: at 175-185° F. | Clear & bright |
| Color, Saybolt | min. 0 |
| Viscosity, SUS: Sec. at 210° F. | max. 59.2 |
| Viscosity, Kin: Cs. at 210° F. | max. 10.0 |
| Melting Point, D 127: °F. | max. 175 | the acid number of said wax being between about 30 and 50 and the penetration value ranging from substantially that of said mixture of aliphatic alpha-olefins prior to oxidation to one 1.6 times that of said mixture of aliphatic alpha-olefins prior to oxidation.

2. An aqueous emulsion containing the product of claim 1.

3. The isocyanated product of claim 1.

4. A salt of the isocyanated product of claim 3.

5. A composition of claim 4 where said salt is a lithium salt.

6. A colloidal solution of the salt of claim 4.

7. A colloidal solution of the salt of claim 5.

8. A colloidal solution paste of the composition of claim 5.

9. The product of claim 1 wherein said mixture is alpha-olefins is produced by (1) reacting ethylene with aluminum triethyl and (2) removing said alpha-olefin mixture.

10. An aqueous emulsion containing the product of claim 9.

11. The isocyanated product of claim 9.

12. A salt of the isocyanated product of claim 11.

13. A composition of claim 12 where said salt is a lithium salt.

14. A colloidal solution of the salt of claim 12.

15. A colloidal solution of the salt of claim 13.

16. A colloidal solution paste of the composition of claim 13.

17. A wax of claim 9 having a hardness substantially the same as that of said mixture of alpha-olefins prior to oxidation.

18. An aqueous emulsion containing the product of claim 17.

19. The isocyanated product of claim 17.

20. A salt of the isocyanated product of claim 19.

21. A composition of claim 20 where said salt is a lithium salt.

22. A colloidal solution of the salt of claim 20.

23. A colloidal solution of the salt of claim 21.

24. A colloidal solution paste of the composition of claim 21.

25. A wax of claim 9 wherein said aliphatic alpha-olefins comprise a mixture of aliphatic alpha-olefins of the composition wherein the Carbon Number Distribution by GLC in weight percent is

| | |
|---|---|
| $C_{28}$ and below | 1.7 |
| $C_{30}$ | 5.0 |
| $C_{32}$ | 11.3 |
| $C_{34}$ | 15.3 |
| $C_{36}$ | 15.5 |
| $C_{38}$ | 13.7 |
| $C_{40}$ | 11.6 |
| $C_{42}$ | 9.1 |
| $C_{44}$ | 8.3 |
| $C_{46}$ | 5.8 |
| $C_{48}$ and above | 2.7 | and the Olefin-Type Distribution by Infrared Spectroscopy in mol percent is

| | |
|---|---|
| $RCH=CH_2$ | 33 |
| $R_2C=CH_2$ | 18 |
| $RCH=CHR$ (cis) | 23 |
| $RCH=CHR$ (trans) | 4 |
| $R_2C=CHR$ | 22 |

26. An aqueous emulsion containing the wax of claim 25.

27. The isocyanated wax of claim 25.

28. A salt of the isocyanated product of claim 27.

29. A composition of claim 28 where the salt is a lithium salt.

30. A colloidal solution of the composition of claim 28.

31. A colloidal solution of the composition of claim 29.

32. A colloidal solution paste of the composition of claim 29.

33. The wax of claim 25 where the acid number is approximately 30, said wax having a hardness substantially the same as that of said mixture of alpha-olefins prior to oxidation.

34. An aqueous emulsion containing the wax of claim 33.

35. The isocyanated wax of claim 33.

36. A salt of the isocyanated product of claim 35.

37. The composition of claim 36 where the salt is a lithium salt.

38. The colloidal solution of the composition of claim 36.

39. The colloidal solution of the composition of claim 37.

40. A colloidal solution paste of the composition of claim 37.

* * * * *